March 20, 1928. 1,663,299
G. GRIST
POWER DRIVEN VEHICLE
Filed Nov. 26, 1926   3 Sheets-Sheet 1

INVENTOR
George Grist
by his attys
Byrnes, Stebbins & Parmelee

March 20, 1928.

G. GRIST 1,663,299

POWER DRIVEN VEHICLE

Filed Nov. 26, 1926

INVENTOR
George Grist
by his attys.
Byrnes, Stebbins & Parmelee

March 20, 1928.
G. GRIST
POWER DRIVEN VEHICLE
Filed Nov. 26, 1926
1,663,299
3 Sheets-Sheet 3
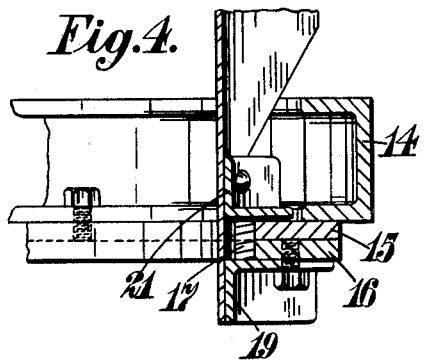
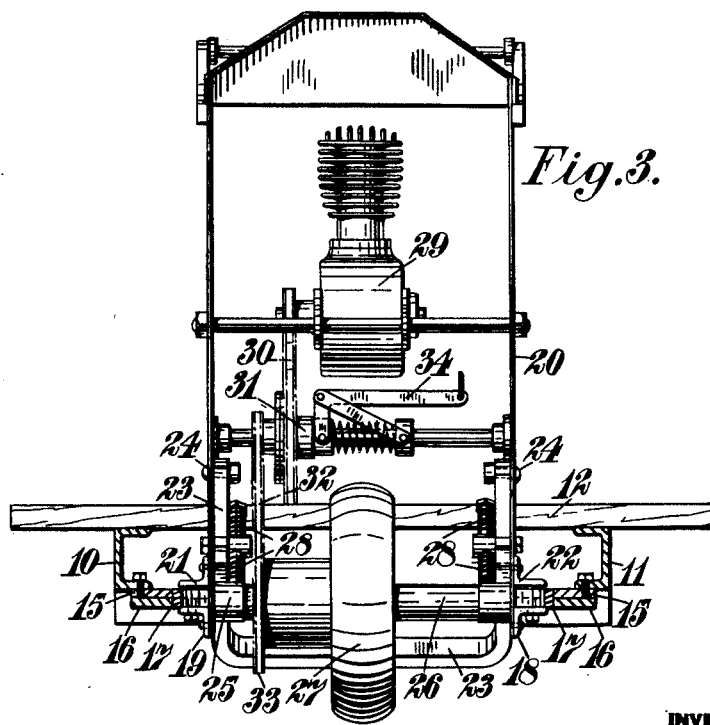

Patented Mar. 20, 1928.

1,663,299

UNITED STATES PATENT OFFICE.

GEORGE GRIST, OF NORTON ST. PHILIP, NEAR BATH, ENGLAND, ASSIGNOR TO R. A. LISTER & COMPANY LIMITED, OF DURSLEY, GLOUCESTERSHIRE, ENGLAND, A BRITISH COMPANY.

POWER-DRIVEN VEHICLE.

Application filed November 26, 1926, Serial No. 150,857, and in Great Britain June 22, 1926.

This invention is for improvements in or relating to power-driven vehicles and has for its object to provide an improved construction of the type of power-driven vehicle having a driving road-wheel or wheels arranged to be rotated from the power unit, with the axle whereon the said wheel rotates (or the axles for the said wheels) adapted to be turned end-for-end, e. g. about a vertical axis, to reverse the direction of rotation of the wheel or wheels with respect to the vehicle.

In a prior construction of vehicle of the type described the power-driven wheel and motor were carried by a circular framework having a turntable connection with the chassis frame, but the weight of the latter was relied on to keep it seated on the circular framework. Under some conditions of operation these two parts could come apart, and an important object of this invention is to obviate this defect.

The present invention presents an improvement on this prior construction in that it provides a power-driven vehicle of the type described wherein the power-driven wheel is carried by a framework comprising a disc-like bearing-ring which is in engagement with a corresponding co-axial disc-like bearing-ring carried by the chassis, in combination with means to maintain the said bearing-rings co-axial with one another, which means are free to rotate relatively to the framework carrying the power-driven wheel or wheels.

More specifically the invention comprises a framework carrying the power-driven unit and driving wheel, which framework comprises angle strips which are disposed as chords of and support a bearing-ring, and a second bearing-ring, which latter is carried by the chassis, rests upon the first-mentioned bearing-ring, and is maintained co-axial therewith by a spigoting-ring.

The accompanying drawings illustrate a power-driven vehicle constructed according to the invention.

In these drawings, which are more or less diagrammatic,

Figure 3 is an end elevation looking from the right in Figure 1; and

Figure 4 is a detail view in section on the line 4—4 of Figure 2.

Like reference characters indicate like parts throughout the drawings.

Figure 1:
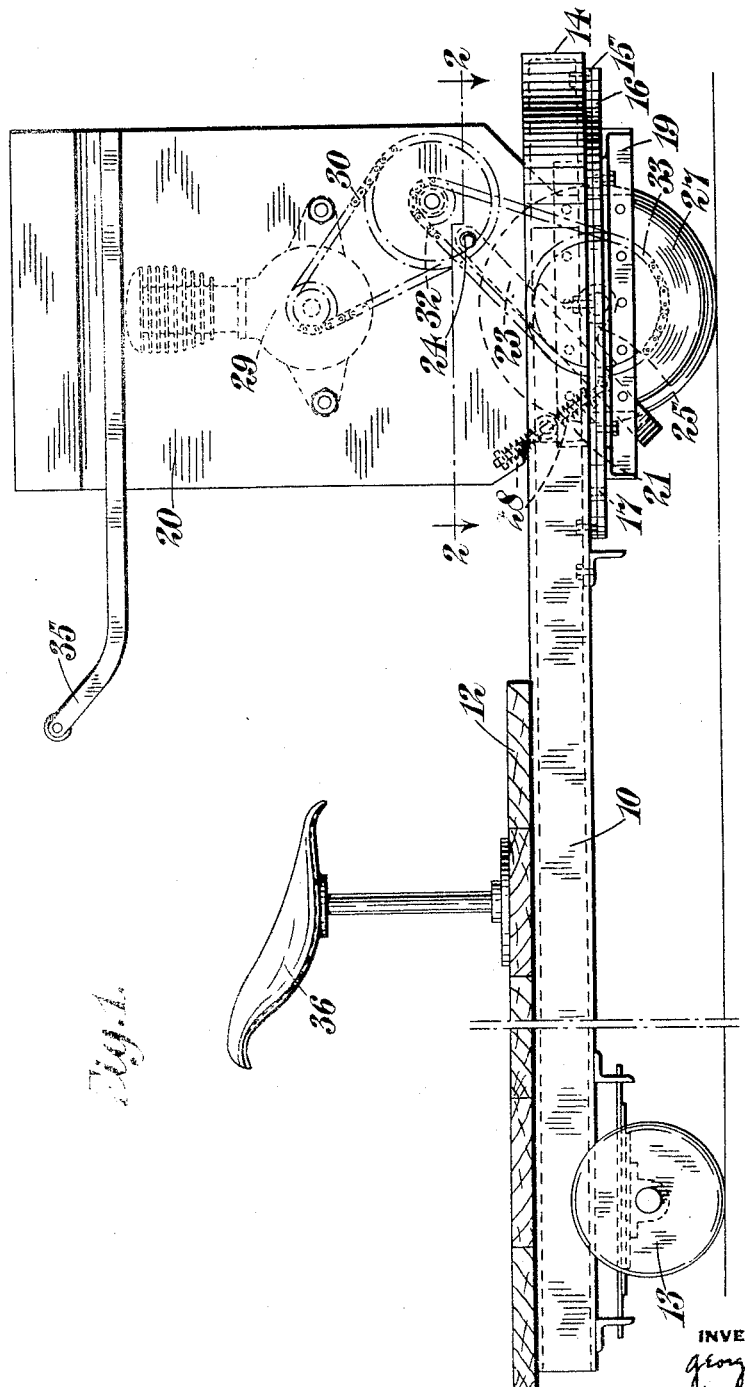
Figure 1 is a side elevation.
Figure 2:
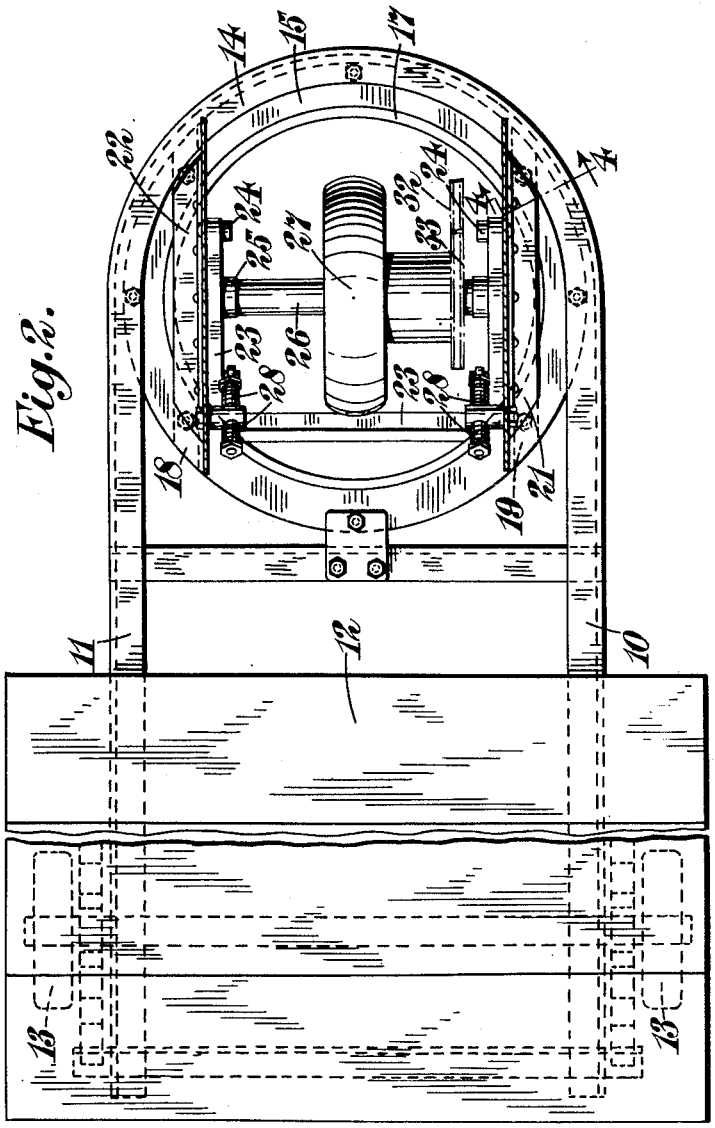
Figure 2 is a plan in section on the line 2—2 of Figure 1.

In the particular embodiment of this invention selected for illustration, it is shown as applied to a platform truck. The longitudinal frame-members 10, 11 which carry the body or platform 12 are supported towards their rear ends by a pair of road-wheels 13, and their forward ends are connected together by a semi-circular piece 14, which may be integral with them, in which case the main frame is constituted by a single U-shaped girder of any convenient section. On the under side of this part 14 there is secured coaxially therewith a flat bearing ring 15, and this bearing ring rests upon a similar bearing ring 16 which, however, is free to rotate relatively to the ring 15. The two rings are maintained coaxial by a loose ring 17 fitting within the two of them and serving as a spigot. This ring 17 could if desired be secured to or made integral with either of the rings 15, 16.

Strips of angle-section are secured to the ring 16 parallel with one another, as shown at 18, 19, and upon these there is mounted a sheet-metal framework or other convenient form of structure 20 to carry an internal-combustion engine and its transmission gearing. Strips 21, 22, similar to the strips 19 and 18, are arranged above them so as to lie above the ring 15, and prevent disengagement of the rings 15, 16 by a direct lifting movement of the ring 15 away from the ring 16.

Within the structure 20 there is pivotally mounted a U-shaped member 23, the pivots being shown at 24 with the member extending downwardly and rearwardly therefrom. Bearing blocks 25 on each limb of this member support a horizontal shaft 26 which carries a single central road-wheel 27. The springing movements of this road-wheel are provided for by the freedom of the member 23 to swing about its pivots 24, and any suitable spring-control for such movement is provided, such for example as shown at 28.

The platform-truck is provided with driving and control mechanisms, which form no part of the present invention, comprising an internal-combustion engine 29 mounted in the framework 20 and driving, as for example, by chain gearing 30, a clutch 31 and a further chain gear 32, a wheel 33 operatively engaged with the road-wheel 27 aforesaid. The clutch is controlled through a lever 34 which is operatively connected, as for example by a Bowden wire or other suitable linkage, to a control-lever suitably situated on a handle 35 secured on the framework or casing 20. Although this transmission is preferred as simple and inexpensive, any other gearing may be used, appropriate to the particular power-unit, or kind of vehicle, or circumstances in which the vehicle is to be used.

It will be seen that the engine, transmission gearing and driving-road-wheel are all mounted on the ring 16 which is freely rotatable relatively to the ring 15, so that the wheel 27 can be turned left or right by means of the handle 35 through any angle relatively to the longitudinal axis of the vehicle up to 180°. In normal use, the truck will be operated by a driver sitting in a seat 36 on the body of the truck, and when he desires to reverse the truck, he will turn the power unit and wheel 27 through 180°, for which purpose he may, if desired, step off the truck, so as to face in the reverse direction when the truck is being driven backwards.

Whilst a particular construction of truck has been described, it is to be understood that the invention is not restricted thereto, for it may be applied to other types of vehicles, and with any kind of power-unit such as a compressed-air-motor, electric-motor, or petrol-electric unit, and various modifications may be made in the constructional details. Thus, for example, the two bearing-rings 15, 16 may be maintained coaxial by means of rollers mounted on the flanged strips 18, 19 so as to engage the inner edge of the ring 15.

I claim:—

In a power-driven vehicle, the combination of a pair of chassis longitudinals, a vertical steering framework having a turntable connection with the same and arranged to rotate about a vertical axis, at least one driving road wheel journalled in said framework to rotate about a horizontal axis and support the framework and chassis longitudinals, and a power-unit supported by said framework and arranged to drive the road wheel, which turntable connection comprises a disc-like bearing-ring carried by said longitudinals, two pluralities of angle strips fixed on the side of said framework, one plurality above and the other below said bearing-ring, a second disc-like bearing-ring carried by the lower plurality of angle strips co-axial with the first bearing-ring and rotatably supporting the latter with the flat faces of said rings face-to-face and extending between said pluralities of angle strips, and a floating ring that is situated between said pluralities of angle strips and is arranged to maintain said bearing-rings co-axial one with the other and is free to rotate in relation to said framework.

In testimony whereof I affix my signature.

GEORGE GRIST.